United States Patent Office 3,311,508
Patented Mar. 28, 1967

3,311,508
METHOD OF ACTIVATING PLATINUM OR PALLADIUM CONTAINING ELECTRODE
Royce E. Biddick, Minneapolis, and William G. Howard, St. Paul, Minn., assignors to Union Oil Company of California, Los Angeles, Calif., a corporation of California
No Drawing. Filed Aug. 19, 1965, Ser. No. 481,056
7 Claims. (Cl. 136—120)

This invention relates to fuel cell electrodes and a method of increasing the electrochemical activity of said electrodes and more particularly is directed to the chemical activation of fuel cell cathodes containing transition metal catalytic material.

The prior art is well aware that the electrochemical activity of some fuel cell electrodes takes some time to be reached during the operation of the fuel cell and is stimulated by the electrochemical process itself. Due to the fact that an apparatus to generate electrical energy needs, for practical application, instantaneous and somewhat constant electrical energy output, these prior art fuel cell apparatuses have suffered from the fact that considerable lengths of time are required before the fuel cell is capable of supplying useful outputs of electrical energy.

Now, in accordance with this invention it has been discovered that with a particular pretreatment of fuel cell electrodes, relatively high current density is achieved almost instantaneously thereby obviating the necessity of running a fuel cell apparatus for extended periods of time before withdrawing useful amounts of energy therefrom. Basically, the invention lies in the utilization of an electrode in a fuel cell apparatus which has been subjected to a hydrogen-containing atmosphere at ambient and/or elevated temperatures for sufficient periods of time to chemically activate the electrode so that it will be able to produce the highest current density within the shortest possible time. While pure hydrogen is the most desirable atmosphere, other atmospheres which contain hydrogen or which upon contact with the electrochemical catalyst yield hydrogen will also suffice so long as other constituents or reaction products in the atmosphere are inert to the catalyst. Thus for example, where the electrochemical catalyst is platinum, ammonia may be used since decomposition of same will yield the necessary hydrogen and the other decomposition product, nitrogen, is inert to the platinum. The types of electrodes that the invention is directed to are those electrodes wherein a transition metal electrochemical catalyst is bonded either within the electrode, and/or on the surface thereof. If hydrogen is allowed to contact the electrode in the presence of oxygen, combustion may be initiated at the catalytic surface. Therefore, as a prerequisite to carrying out the hydrogen-contacting step, the electrode is flushed or placed in an atmosphere which is inert to the catalytic material, such as nitrogen, and thereafter the electrode is contacted with the hydrogen atmosphere. Similarly, after the electrode has been subjected to the hydrogen atmosphere for a sufficient length of time, at either room or elevated temperatures, the hydrogen atmosphere is replaced with the inert atmosphere prior to allowing the electrode to contact oxygen-containing atmospheres or the electrolyte utilized in the fuel cell.

While it is not exactly known by what process the activation of the electrodes is accomplished, it is believed that the hydrogen treatment produces an interstitial compound or hydride of a transition metal element. An interstitial compound is intended to denote a situation wherein hydrogen occupies the holes in the crystal lattice of a metal. Thus, a true chemical combination may or may not take place. In any event, it is only necessary that the transition metal-containing electrode body be subjected to the briefly alluded-to foregoing treatment.

The principal and subsidiary objects of the invention will become readily apparent from the following detailed description, and the only limitations which are to be imparted to the hereindisclosed invention are those that are explicitly contained in the appended claims.

The fuel cell structure in which the treated electrodes of this invention may be used, are those commonly known in the art and also the novel type of pocket fuel cell disclosed and claimed in U.S. copending application, Ser. No. 408,909, filed Nov. 4, 1964. Therein is disclosed a fuel cell structure comprising at least one anode and one cathode separated by an absorbent element, and wherein electrolyte is absorbed within that element and the top and bottom of the cell structure is open to the ambient atmosphere thereby obtaining substantial pressure equalization between the top and bottom of the cell.

The hereindisclosed invention is also directed to a method of fabricating a highly active electrochemical electrode employing other embodiments disclosed in the prior art, such as wetproofing, and also the additional embodiment of combining with the electrode body hydrophilic materials so as to form fluid conducting paths extending substantially throughout the electrode body as, for example, as is disclosed in U.S. copending application Ser. No. 408,724, filed Nov. 4, 1964.

While the transition metal elements, i.e., iron, cobalt, nickel, ruthenium, rhodium, palladium, osmium, iridium and platinum have achieved no little notoriety in the fuel cell art, it is well known that the preferred metals are those of palladium and platinum. Thus, this invention will have its greatest applicability to those electrodes which depend upon palladium and platinum for effectively high electrochemical activity. The substrates upon which catalytic material is disposed or the materials in which the catalytic material is bonded, and subsequently applied to a substrate, are those well known in the art. Examples of substrates include such electrically conductive supports, as metal wire screen or fibrous metal mat fabricated of known electrically conductive metals, such as stainless steel, nickel, tantalum, platinum, palladium, titanium, silver, niobium, etc, having a mesh size from about 20–400 per inch. Also included are carbon and graphite materials and/or supports of which materials a prolific disclosure is available in the prior art.

The amount of transition metal used in the electrode depends mainly on whether or not it is supported on a carrier, such as activated carbon, or whether or not it is mixed with a diluent, such as graphite, metal powder, or zirconyl phosphate polymer. The catalyst is generally present in an amount not less than 0.1 milligram per square centimeter of the fabricated electrode. The more expensive catalysts, such as platinum and palladium, will normally and practically necessitate the use of a support or a diluent. The transitional metal itself may be incorporated with the components of the electrode body during fabrication as a free metal or alternatively, may be disposed in the component mixture as the salt of a transitional metal which, after fabrication of the electrode, is capable of reduction so as to yield the free metal. The types of salts which are readily reducible and the methods of achieving reduction of the salts, are matters which are well within the skill of the art and need not be discussed herein as same is outside the scope of this invention. However, it is preferred that the free metal be combined with the components of the electrode body before the electrode body is formed. In a preferred embodiment, the electrode is wetproofed with materials and compounds including hydrocarbons, substituted hydrocarbons, and silicones. Halogen containing polymers, such as the fluorocarbon polymers, in the form of an aqueous emulsion is preferred. A suitable, commercially available emulsion is "Teflon," a tetrafluoroethylene fluorocarbon resin. The weight of the catalyst to the polymer emulsion is within the range of about 50:1 to 1:1. Other satisfactory materials which may be utilized to impart some degree of hydrophobicity to the electrode are "Kynar" a vinylidene fluoride resin and "Viton A," a copolymer of hexafluoropropylene and vinylidene fluoride.

As indicated earlier, a highly active fuel cell electrode is obtained by incorporating in the electrode body, hydrophilic materials which form fluid conducting paths within the electrode body so as to create as many three-phase contacts between gas, liquid and solid, necessary for electrochemical reaction, as possible. Exemplary of satisfactory hydrophilic materials are, for instance, finely shredded asbestos fiber of 10 to 325 mesh size, glass wool, synthetic fibers such as "Dynel" or nylon, celite, porous silica or alumina, fibrous silica or alumina, zirconyl phosphate and other known hydrophilic materials which are inert under fuel cell operating conditions considering the temperatures, electrolytes and fuels utilized in the operation of the fuel cell apparatus. The hydrophilic material may also be metallic, preferably porous or fibrous, as, for example, finely divided Mond nickel formed by the decomposition of nickel carbonyl vapor. Other fibrous, powdered metals of tantalum, platinum, titanium, silver, niobium, etc. may also be used.

Where the electrode body is fabricated from carbonaceous material, the pore size, surface area, density, etc. necessary for effective electrochemical activity are matters which are well known in the art. Where a wire substrate is used, the wire mesh support or screen may be of 20–400 mesh and the catalyst may or may not be wetproofed with a hydrophobic material prior to catalyst application to the metallic screen or prior to mixing the catalytic material with suitable hydrophilic materials. Generally, the methods disclosed in co-pending U.S. application Ser. No. 408,724, filed Nov. 4, 1964, directed to the novel use of these hydrophilic materials in electrode bodies, may be followed and adhered to with, of course, the limitation that only transition metal elements be used as catalytic material and that the fabricated electrode be subjected to the hydrogen treatment of this invention.

Generally, however, the procedure simply consists of making a catalyst-wetproofing material slurry; partially drying the slurry to a pliable consistency, adding a hydrophilic material such as asbestos to the semidried mixture, for example about 0.1 to 25 weight percent of the fiber based on the semidried mixture and then spreading the semidried mixture onto a suitable substrate, pressing the mixture onto the substrate under sufficient pressure, for example 25 p.s.i. to 36,000 p.s.i., to form a coherent electrode body and then heating the fabricated electrode for a time sufficient to produce an electrode of mechanically sound structure, for example from about 1 minute to 1 hour at a temperature of about 150 to 350° C.

Thereafter the fabricated electrode is flushed free of most of the oxygen and oxygen-containing gases by an inert gas such as nitrogen, in order to prevent combustion when hydrogen is added. This preliminary step can normally be accomplished quite readily, it only being necessary to displace with nitrogen, or other inert gas, oxygen and oxygen-containing gases from the surface and interior pores of the electrode.

The electrode is then preferably subjected to an atmosphere consisting principally of hydrogen for a time sufficient to permit the displacement of the inert gas from the pores and surface of the electrode with the hydrogen and to permit the occlusion and reaction of hydrogen at the catalyst. Atmospheres containing as little as 10 vol. percent of hydrogen may also be used providing oxygen or oxygen-containing substituents are not present. Ordinarily, the duration of electrode exposure to the hydrogen atmosphere for about ¼ to 24 hours at ambient temperature will suffice. Obviously exposure of the electrode to the activating hydrogen may take place under superatmospheric pressures which will decrease the exposure time. An empirical method of determining the extent of activation or the optimum activation merely involves testing the treated electrode according to procedures well known in the art for determining electrochemical activity, as for example, by testing the treated electrode as a half cell using a calomel reference electrode.

Although higher temperatures, up to 100° C. have been used, no advantage has been found over ambient temperature. Thereafter, the electrode is again subjected to an inert atmosphere, as in the preliminary treatment step, to remove most of the unabsorbed or free hydrogen so that upon contact with an oxygen-containing atmosphere combustion will not result. By unabsorbed or free hydrogen is meant that hydrogen which is not contained within the lattice structure of the catalytic metal. The duration of treatment and amount of inert gas will generally be the same as that utilized to prepare the electrode for hydrogen exposure.

While the invention has been described in relation to fabricated electrodes, it is readily apparent that the catalytic metal alone may be subjected to treatment and later incorporated in the electrode body. However, because the catalytic metal is of necessity small in size, this method, along with the attendant precautions necessary to prevent oxygen exposure is not economically feasible. Also, in fabricating the electrode the catalyst may be subjected to conditions deleterious to catalyst activity.

Additionally, the disclosed hydrogen activation or treatment of the electrodes need not be practiced on the electrodes per se. It is well known that the current density of fuel cell electrodes tend to decrease appreciably after several or several hundred hours of fuel cell operation. Thus, one means of re-establishing high catalytic activity of the "spent" electrodes according to the method of this invention merely involves interrupting fuel cell operation and subjecting the entire fuel cell battery or structure to the hydrogen treatment as heretofore disclosed for electrodes alone, and then subsequently returning the fuel cell to operation. This treatment has resulted in increased current density, almost to the highest levels obtained, for fuel cells which had operated for several hundred hours.

The following examples are merely to serve as being illustrative of several of the specific embodiments of this invention.

Example I

A catalyst mixture was prepared by adding three parts by weight of a partially dried mixture of palladium black and Teflon 30B emulsion with one part of —325 mesh zirconium phosphate prepared by the method of R. P. Hamlen in J. Electrochem. Soc., 109, pp. 746–749 (1962). The mixture was pressed onto a 40 mesh nickel screen at 3500 p.s.i. and heated at 340° C. The finished electrode contained 80 mg. of $Pd/cm.^2$. The electrode was activated by passing a stream of hydrogen over it for 24 hours at 100° C. Before and after being treated with hydrogen, the electrode was placed in a stream of nitrogen for 15 minutes to flush active gases from the pores.

Example II

A second electrode was prepared in the same manner as the electrode in Example I except that the electrode was not subjected firstly, to an inert atmosphere to exclude all oxygen and oxygen-containing gasses, secondly, an atmosphere consisting essentially of hydrogen, and thirdly, the inert atmosphere flushing step.

The electrodes were tested as cathodes in 6 N $H_2SO_4$ electrolyte at 25° C. using pure oxygen at a pressure of 0.5 p.s.i.g. The electrode treated in accordance with this invention yielded a current density of 77 ma./$cm.^2$ at 0.5 v. vs. SCE, whereas the untreated electrode tested in the same manner yielded a current density of only 1.4 ma./$cm.^2$. Thus, the increased activity of the transition metal catalyst, due to the hydrogen treatment, is manifest.

The embodiments of this invention in which an exclusive property or privilege is claimed are defined as follows:

1. The method of chemically activating an electrochemical transition metal catalyst selected from platinum and palladium bonded within an electrode for use in a fuel cell consisting essentially of exposing the electrode to an atmosphere consisting principally of hydrogen, at ambient temperature, for a time sufficient to increase the electrochemical activity of said transition metal and thereafter subjecting the electrode to an inert atmosphere to remove all traces of free hydrogen before exposing the electrode to oxygen-containing atmospheres.

2. The method of claim 1 wherein said transition metal is palladium.

3. The method of claim 1 wherein said transitional metal is platinum.

4. The method of claim 3 which additionally includes the steps of flushing the electrode of substantially all oxygen-containing atmospheres prior to initiating the exposure of said electrode to said hydrogen atmosphere.

5. The method of fabricating a fuel cell electrode of high activity comprising the steps of:
   (a) treating a transition metal electrochemical catalyst selected from platinum and palladium with an aqueous emulsion of a fluorocarbon polymer to obtain a mixture, said catalyst being present in an amount not less than 0.1 milligram per square centimeter of the fabricated electrode, the weight of said catalyst to said polymer emulsion being within the range of about 50:1 to 1:1;
   (b) allowing said mixture to dry to a pliable paste and thereafter mixing said paste with about 0.1 to 25 weight percent, of said paste, of 10 to 325 mesh size asbestos fibers;
   (c) applying the resultant mixture of step (b) to a 20 to 400 mesh metal screen;
   (d) subjecting said treated screen to a compressive force of about 25 p.s.i. to 36,000 p.s.i.;
   (e) heating said screen at a temperature of about 150 to 350° C. for about 1 minute to 1 hour, and thereafter subjecting the fabricated electrode to an inert atmosphere to remove oxygen and oxygen-containing gases from the surface and pores of said electrode and subsequently exposing the electrode to an atmosphere consisting essentially of hydrogen for a period of time whereby the electrochemical activity of said electrode is substantially increased and subsequently subjecting the electrode again to an inert atmosphere to remove free hydrogen from the surface of said electrode before exposing said treated electrode to an atmosphere containing oxygen or oxygen-containing gases.

6. The method in accordance with claim 5 wherein said transition metal is palladium and said hydrogen treating step is carried out at 25° to 100° C. for a period of time of about ¼ to 24 hours.

7. The method of increasing the electrical energy output of a fuel cell wherein said fuel cell comprises electrodes containing transition-metal catalyst selected from platinum and palladium bonded thereto, the steps comprising:
   (a) subjecting the fuel cell and its electrodes to an inert atmosphere to remove oxygen-containing compounds from proximity thereof;
   (b) subjecting the fuel cell and its electrodes to an atmosphere consisting essentially of hydrogen for a period of time sufficient to increase the electrical energy output of said cell; and
   (c) subjecting the fuel cell and its electrodes to an inert atmosphere to remove the excess hydrogen of step (b) before exposing same to an oxygen-containing atmosphere.

References Cited by the Examiner

UNITED STATES PATENTS

| | | | |
|---|---|---|---|
| 2,381,677 | 8/1945 | Matuszak | 252—411 |
| 3,117,034 | 1/1964 | Tirrell | 136—120 |
| 3,183,123 | 5/1965 | Haworth | 136—120 |
| 3,203,834 | 8/1965 | Breiner | 136—120 |
| 3,212,930 | 10/1965 | Thompson et al. | 136—120 |
| 3,212,936 | 10/1965 | McEvoy et al. | 136—120 |

WINSTON A. DOUGLAS, *Primary Examiner.*

A. SKAPARS, *Assistant Examiner.*